United States Patent

[11] 3,549,832

| | | |
|---|---|---|
| [72] | Inventor | Kenneth K. Ferryman, Jr.<br>St. Clair Shores, Mich. |
| [21] | Appl. No. | 817,649 |
| [22] | Filed | Apr. 21, 1969 |
| [45] | Patented | Dec. 22, 1970 |
| [73] | Assignee | Essex International, Inc.<br>Fort Wayne, Ind.<br>a corporation of Michigan |

[54] HAZARD WARNING SWITCH CONSTRUCTION
16 Claims, 7 Drawing Figs.

[52] U.S. Cl. .................................................. 200/16,
    200/61.54
[51] Int. Cl. ............................................... H01h 15/00
[50] Field of Search .......................................... 200/61.27
    —61.38, 61.54, 16, 46, (Inquired)

[56]         References Cited
            UNITED STATES PATENTS

| 2,347,874 | 5/1944 | Bluemle | 200/77 |
| 2,948,832 | 8/1960 | Hollins | 200/61.35X |
| 3,174,000 | 5/1965 | Golbeck | 200/16X |
| 3,339,032 | 8/1967 | Hultz | 200/68X |
| 3,371,172 | 2/1968 | McLure | 200/61.54 |

Primary Examiner—Robert K. Schaefer
Assistant Examiner—M. Ginsburg
Attorney—Learman & McCulloch ABSTRACT: A hazard warning switch for operating simultaneously warning signals at the left-and right-hand sides of a vehicle has a reciprocable actuator mounted within a casing for movement manually from an inoperative position to an operative position, and for return movement to its inoperative position in response to rotation of the vehicle's steering mechanism. The actuator is provided with a pair of grooves spaced axially of the actuator and the casing is provided with a resiliently biased pawl adapted to seat in either groove and yieldably maintain the actuator in a selected one of its positions. The adjacent walls of the grooves converge in a direction toward the pawl whereby the bias of the pawl is operable to effect movement of the actuator from an intermediate position between the operative and inpositions to a selected one of such positions.

PATENTED DEC22 1970 3,549,832

INVENTOR.
KENNETH K. FERRYMAN JR.
BY
*Learman & McCulloch*

HAZARD WARNING SWITCH CONSTRUCTION

This invention relates to a switch especially adapted for controlling the operation of a vehicle's hazard warning signals. More particularly, the invention relates to a hazard warning signal operating switch movable manually from an inoperative position to an operative position and which is returnable to its inoperative position either manually or in response to rotation of a cam carried by the vehicle's steering mechanism for rotation therewith.

Hazard warning switch operating devices of the kind with which the invention is concerned are well known and in recent years have included movable contacts carried by a reciprocable actuator which is movable radially of the axis of rotation of the vehicle's steering shaft. In those constructions in which the actuator is returned to its inoperative position from its operative position by means of a movable cam, it is essential that the movement of the actuator be sufficiently great to effect disengagement of the actuator-carried contacts from the hazard warning signal fixed contacts and thereby assure cancellation of the hazard warning signals. In prior constructions the movement capable of being imparted to the actuator by the cam is relatively small. Consequently, it has been the practice in most of the known constructions to employ a spring which biases the actuator to its inoperative position and which cooperates with the cam to effect the required movement of the actuator.

The utilization of a biasing spring for the purpose described does assure cancellation of the hazard warning signals, but since the spring constantly biases the actuator to its inoperative position, some means must be provided to latch the actuator in its operative position when operation of the hazard warning signals is required. This results in two possible disadvantages. First, any looseness or imperfect matching between the latching means on the actuator and the casing may enable the biasing spring to hold the actuator in such position that imperfect engagement is made between the fixed and movable contacts which effect operation of the hazard warning signals. Second, the holding force exerted on the actuator by the latching means cam must be sufficient to overcome the biasing force of the spring. The canceling cam means, therefore, must be capable of overcoming the holding force of the latching means. In those instances in which the canceling cam is of delicate construction, the holding force of the latching means may be sufficient to damage the canceling cam or other parts of the switching mechanism, or both.

When a hazard warning switch operator is moved to and from its operative position, movable contacts move into and out of engagement with selected fixed contacts so as to enable and disable operation of the hazard warning signals. Such movements of the movable contacts sometimes results in relative high current surges upon initial operation of the signals or in arcing between the movable and fixed contacts, particularly if both the forward and rearward signals are energized and deenergized simultaneously.

An object of this invention is to provide a hazard warning signal actuating mechanism which overcomes the disadvantages of known constructions.

Another object of the invention is to provide a hazard warning signal switch actuating means which eliminates the necessity of spring means for biasing the actuator to its inoperative position.

A further object of the invention is to provide a switch of the character described and in which means is provided for latching the actuator in both its operative and inoperative positions and with substantially the same force, which force is sufficiently light to permit relatively free movement of the actuator between its two positions.

Another object of the invention is to provide latching means for the actuator of a hazard warning switch and in which the latching means not only holds the actuator in a selected position, but urges the latter toward either of its positions.

Another object of the invention is to provide latching means of the kind referred to in which the latching means forms an integral part of the switch assembly.

A further object of the invention is to provide for the sequential energization and deenergization of two sets of warning signals to avoid current surges and minimize the possibility of arcing between fixed and movable contacts.

Other objects and advantages of the invention will be pointed out specifically or will become apparent from the following description when it is considered in conjunction with the appended claims and the accompanying drawings in which:

Figure 1:
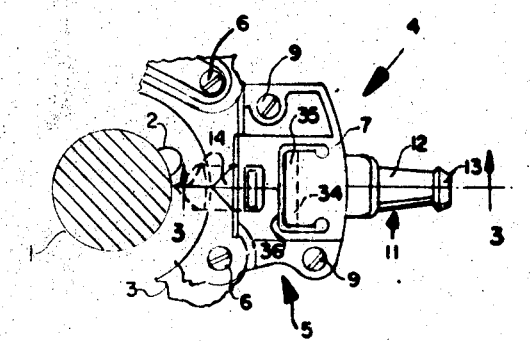
FIG. 1 is a fragmentary view, partly in top plan and partly in section of apparatus construction in accordance with the invention.
Figure 2:
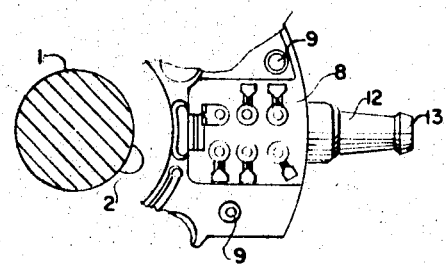
FIG. 2 is a bottom plan view of the apparatus shown in FIG. 1.

Apparatus constructed in accordance with the invention is adapted for use with a vehicle having a rotatable steering shaft 1 on which is mounted a canceling cam 2 which moves in an orbital path in response to rotation of the shaft 1. The steering shaft is enclosed within a tubular column, fragmentarily indicated at 3 in FIG. 1. The vehicle conventionally is equipped with left-hand and right-hand signaling indicators or lamps (not shown) for indicating selectively a left-hand or right-hand turn under the control of a direction signal operating mechanism (not shown). The left-hand and right-hand signaling indicators may be operated simultaneously, however, so as to indicate to the drivers of oncoming vehicles a potentially hazardous condition. The simultaneous operation of the signaling indicators is referred to as a hazard warning signal.

Hazard warning signal operating means is designated generally by the reference character 4 and comprises a casing 5 formed of resilient flexible insulating material such as nylon and mounted on the column 3 adjacent the cam 2 by screws 6 or the like. The casing is formed of two halves 7 and 8 maintained in assembled relation by screws or rivets 9.

The casing defines a hollow chamber 10 in which is accommodated a reciprocable actuator 11 formed of insulating material and comprising a body 12 terminating at one end in a finger piece 13 and at the other end in a beveled tongue 14. Between the ends 13 and 14 the body 12 is provided with an intermediate portion 15 having on each of its opposite sides a longitudinally extending forward rail 16a and a rearward rail 16. Electrically conductive contacts 17 are carried by the intermediate portion 15 of the body 12 for movement therewith and comprise spaced apart, generally U-shaped contact elements 18 and 19 bridged by an arm 20 forming part of the element 18. The arm 20 has at its free end a dimple 21 which is received in a corresponding dimple 22 formed in the contact element 19. The contact elements 18 and 19 have barbed arms 23 and 24, respectively, which suspend the contact elements from the rails 16a and 16 and within a recess 25 formed in the body portion 15. A spring 26 is interposed between the base of the recess 25 and the arm 20 so as to bias the arm, and consequently, the contact elements 18 and 19, in a direction away from the base of the recess 25 and toward the base 27 of the chamber 10. The length of the element 18 is greater that than that of the element 19 so as to span the distance between a pair of ledges 27a located one at each side of the casing. The forward end of each ledge terminates in a ramp 27b which is inclined upwardly and rearwardly from the base 27 of the chamber 10.

Mounted in the base of the chamber 10 is a plurality of fixed, spaced apart pairs of contacts 28, 29 and 30 which are connected by suitable wiring to a source of electrical energy, a flasher unit, and to the vehicle's signaling indicators, as is conventional. The movable contacts 17 are biased by the spring 26 toward the fixed contacts 28—30 so as to assure good electrical contact therebetween and to provide for wiping engagement between the fixed and movable contacts in response to axial movement of the actuator 11.

Figure 3:
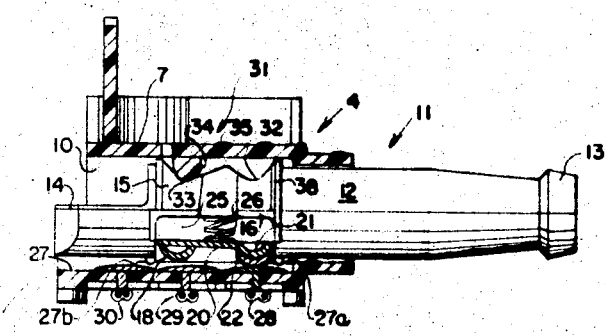
FIG. 3 is an enlarged, sectional view taken on the line 3—3 of FIG. 1, and illustrating the switch actuator in its inactive position.

In the position of the actuator illustrated in FIG. 3, the movable contact element 18 spans the ledges 27a and is free of engagement with all of the fixed contacts. The movable contact 19, however, bridges the pair of fixed contacts 28. In this position of the actuator the hazard warning signals are inoperative. In the position of the actuator 11 shown in FIG. 4, however, the movable contact element 18 bridges the fixed pair of contacts 30 and the element 19 bridges the pair of fixed contacts 29. In this position of the actuator, the hazard warning signals are operative.

When the actuator 11 is moved from its inoperative position to its operative position, the rear contact element moves first into a position in which it engages both pairs of fixed contacts 28 and 29 and then into a position in which it bridges only the pair of contacts 29. The length of the ledges 27a is such that the forward contact element 18 does not move down the ramps 27b and into engagement with the fixed contacts 30 until after the rear contact element 19 has engaged the contacts 29 and disengaged the contacts 29. The sequential engagement of the contacts 29 and 30 avoids accumulative current surges. When the actuator 11 is returned to its inoperative position, the forward contact element climbs the ramps 27b and disengages the contacts 30 prior to the disengagement of the contact element 19 from the contacts 29. The sequential disengagement of the elements 18 and 19 from the fixed contacts minimizes arcing.

Cooperable latch means 31 is provided for releasably latching the actuator 11 in either of its two positions and comprises a pair of axially spaced, generally V-shaped grooves 32 and 33 formed in the intermediate body portion 15 of the actuator, and a pawl 34 adapted to seat in either groove. The pawl 34 is formed integrally with a resilient arm 35 which is an integral part of the casing half 7 and is formed by a three-sided slot 36 in the casing half 7. Inasmuch as the arm 35 constitutes an integral part of the casing half 7, it normally assumes a position in a horizontal plane, as shown in FIGS. 3 and 4, but due to the resilience of the material from which the casing half is made, the arm 35 may be flexed out of its normal plane.

The grooves 32 and 33 have adjacent walls 36 and 37, respectively, which converge in a direction toward the pawl 34. The terminal end walls 38 and 39 of the respective grooves 32 and 33 diverge in a direction toward the pawl 34, and are formed on a steeper slope than that of the walls 36 and 37. The terminal end walls 38 and 39 thus constitute limit means for limiting the travel of the actuator 11.

Figure 4:
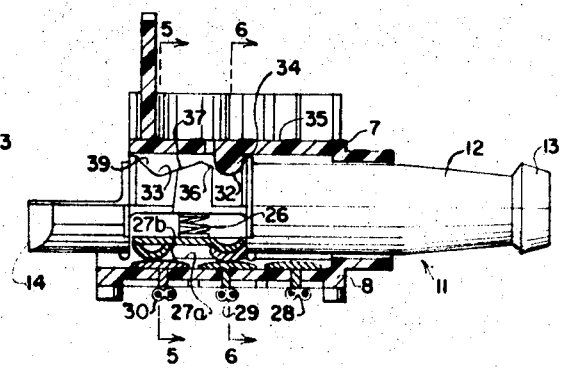
FIG. 4 is a view similar to FIG. 3, but illustrating the actuator in its operative position.
Figure 7:
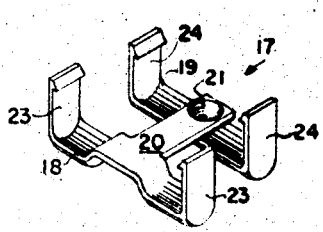
FIG. 7 is an isometric view of movable switch contacts carried by the actuator.
Figures 5, 6:
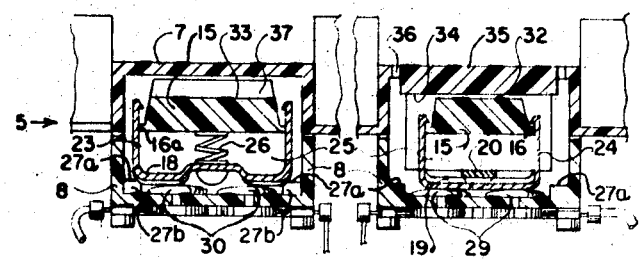
FIG. 5 is a sectional view taken on the line 5—5 of FIG. 4.
FIG. 6 is a sectional view taken on the line 6—6 of FIG. 4.

The actuator 11 may be moved from its inoperative position shown in full lines in FIG. 1 and in FIG. 3 toward its operative position shown in FIG. 4 by the manual application of a force on the finger piece 13 so as to shift the actuator 11 toward the left, as viewed in FIG. 3. As the actuator moves toward the left the pawl 34 will climb the inclined wall 37 of the groove 33, thereby displacing the arm 35 upwardly and stressing the latter. When the actuator 11 reaches an intermediate position at the juncture of the inclined walls 36 and 37, further movement of the actuator to the left will cause the pawl 34 to bear against the inclined wall 36. The slope of the wall 36, coupled with the resilience of the arm 35, will cause the pawl 34 to urge the actuator 11 further toward the left until such time as the pawl 34 seats in the groove 32 and engages both of the walls 36 and 38. In these positions of the parts, the movable contact 17 will engage the pairs of fixed contacts 29 and 30 so as to operate simultaneously the hazard warning signals. The tongue 14 will also be in the projected position shown in dotted lines in FIG. 1 and in which position it lies in the path of rotation of the cam 2 for engagement thereby.

When the actuator 11 is in its operative position rotation of the steering shaft 1 in either direction will cause the cam 2 to engage the projected tongue 14 and exert a force on the latter tending to move the actuator 11 and the movable contacts to the right from the position shown in FIG. 4, thereby effecting simultaneous cancellation of the hazard warning signals. As the actuator 11 moves to the right, the pawl 34 will climb the groove wall 36 until such time as the actuator reaches the intermediate position in which the pawl 34 lies at the juncture of the all walls 36 and 37. Further movement of the actuator to the right then will cause the pawl 34 to bear against the inclined wall 37, whereupon the arm 35 will exert a force on the actuator via the pawl 34 to continue movement of the actuator to the right until such time as the actuator reaches its inoperative position in which the pawl 34 seats in the groove 33 and engages both of the walls 37 and 39. The radial length of the cam 2 and the length of the tongue 14 are so selected as to assure that the cam 2 will not disengage the tongue 14 until such time as the actuator has been moved from its inoperative position a distance sufficient to enable the pawl 34 to engage the inclined wall 37.

It is not necessary that the actuator 11 be returned from its operative position to its inoperative position by means of the cam 2. The actuator may be returned to its inoperative position manually by means of the finger piece 13.

Regardless of whether the actuator 11 is in its operative or its inoperative position, the engagement of the pawl 34 with both walls of the associated recess will hold the actuator in either position without looseness. Accordingly, there will be no looseness of the actuator 11 and, consequently, no likelihood that the fixed and movable contacts will be misaligned.

The disclosed embodiment is representative of a presently preferred embodiment of the invention, but is intended to be illustrative rather than definitive thereof.

I claim:

1. A switch construction comprising:
   a casing member;
   an actuator member mounted in said casing member for movements along a path between first and second positions;
   a plurality of fixed contacts supported by said casing member and spaced along said path;
   a plurality of contact elements carried by said actuator member for movements with the latter and relative to each other and spaced along said path, said contact elements being engageable with and disengageable from selected ones of said fixed contacts; and
   means in the path of movement of at least one of said contact elements for moving the latter relatively to the remainder of said contact elements to prevent simultaneous engagement and disengagement of all of said contact elements with and from said selected fixed contacts.

2. The construction set forth in claim 1 wherein the last mentioned means comprises a ramp supporting said of one of said contact elements.

3. The construction set forth in claim 1 including latch means acting on said actuator member for yieldably maintaining the latter in a selected one of said positions.

4. The construction set forth in claim 3 wherein said latch means comprises a pair of grooves in one of said members and spaced from one another along said path, a pawl carried by the other of said members, and resilient means acting on said pawl and constantly urging the latter in a direction toward said one of said members for removable reception in either of said grooves.

5. The construction set forth in claim 4 wherein said grooves have adjacent sidewalls which converge toward one another in a direction toward said other of said members.

6. The construction set forth in claim 4 wherein said actuator member extends beyond said casing member at both ends of the latter to provide means at each end of said actuator member for moving the latter relatively to said casing member.

7. The construction set forth in claim 4 wherein said pawl is joined to said other member by a resilient, flexible arm.

8. The construction set forth in claim 7 wherein said pawl and said arm are integral with said other member.

9. The construction set forth in claim 4 wherein said grooves are in said actuator member and said pawl is on said casing member.

10. The construction set forth in claim 4 wherein said fixed contacts are spaced apart on said casing member and said contact elements are bridging contacts to bridge selected ones of said fixed contacts.

11. The construction set forth in claim 10 wherein said bridging contacts comprise a pair of spaced apart, conductive elements interconnected by a conductive arm.

12. The construction set forth in claim 11 including spring means acting on one of said conductive elements and urging the latter in a direction toward said fixed contacts, the force of said spring means being transmitted to the other of said conductive elements by said conductive arm.

13. A switch construction comprising:
a casing member;
an actuator member mounted in said casing member for movements along a path between first and second positions;
electrical contacts carried by said members for engagement and disengagement in response to movements of said actuator member; and
cooperable latch means on said members for yieldably latching said actuator member in either of said positions, said latch means comprising a pair of generally V-shaped grooves in one of said members spaced from one another along said path and a resilient arm constituting part of the other of said members and having a free end removably accommodated in a selected one of said grooves.

14. The construction set forth in claim 13 wherein the free end of said arm is enlarged for simultaneous engagement with opposite walls of said selected one of said grooves.

15. The construction set forth in claim 14 wherein said arm constitutes part of said casing member and said grooves are formed in said actuator member.

16. The construction set forth in claim 15 wherein said arm is formed by a three-sided slot in said casing member.